United States Patent
Gale et al.

[11] Patent Number: 5,285,407
[45] Date of Patent: Feb. 8, 1994

[54] MEMORY CIRCUIT FOR SPATIAL LIGHT MODULATOR

[75] Inventors: Richard O. Gale, Richardson; Benjamin Perrone, Dallas, both of Tex.

[73] Assignee: Texas Instruments Incorporated, Dallas, Tex.

[21] Appl. No.: 815,441

[22] Filed: Dec. 31, 1991

[51] Int. Cl.$^5$ .............................................. G11C 7/00
[52] U.S. Cl. ............................. 365/189.11; 365/230.06
[58] Field of Search ................ 365/189.11, 230.06, 365/234, 215; 359/317

[56] References Cited

U.S. PATENT DOCUMENTS

| | | | |
|---|---|---|---|
| 4,636,981 | 1/1987 | Ogura | 365/189.11 |
| 4,642,798 | 2/1987 | Rao | 365/189.11 |
| 4,896,297 | 1/1990 | Miyatake | 365/189.11 |
| 4,956,619 | 9/1990 | Hornbeck | 359/317 |
| 4,984,215 | 1/1991 | Ushida | 365/189.11 |
| 5,022,000 | 6/1991 | Terasawa | 365/189.11 |
| 5,031,149 | 7/1991 | Matsumoto | 365/189.11 |

Primary Examiner—Eugene R. LaRoche
Assistant Examiner—A. Zarahian
Attorney, Agent, or Firm—James C. Kesterson; Richard A. Stoltz; Richard L. Donaldson

[57] ABSTRACT

A memory circuit for use with a spatial light modulator having an array of electrically addressable, micro-mechanical, modulating elements, whose address electrodes determine how that element will affect incident light. The memory circuit has at least one static memory cell in communication with the address electrodes of each modulating element. Each memory cell receives data for determining its micro-mechanical movement via a bit-line down each column of memory cells. A row select signal determines whether the data will be written to that row. A two-level voltage line supplies power to each memory cell, with one level being used for writing to the cell and another level being used for operating the modulating element.

19 Claims, 5 Drawing Sheets

MEMORY CIRCUIT FOR SPATIAL LIGHT MODULATOR

RELATED PATENT

The following patent application is related to the present application, and is incorporated by reference herein:

U.S. Pat. No. 4,956,619, "Spatial Light Modulator".

TECHNICAL FIELD OF THE INVENTION

This invention relates to spatial light modulators comprised of arrays of pixel elements, and more particularly to an improved structure for storing data for writing to and operating individual pixel elements.

BACKGROUND OF THE INVENTION

Spatial light modulators (SLM's) are transducers that modulate incident light in a spatial pattern corresponding to an electrical or optical input. The incident light may be modulated in phase, intensity, polarization, or direction. The light modulation may be achieved by a variety of materials exhibiting various electro-optic or magneto-optic effects and by materials that modulate light by surface deformation. SLM's have found numerous applications in the areas of optical information processing, projection displays, and electrostatic printing.

Many SLM applications involve some sort of data storage on a per pixel basis. For example, when used for video display systems, SLM's take the place of raster-scan electron beam devices. The SLM is comprised of an area array of individually addressable pixel elements, each of which corresponds to a point of an image. For display, light from each pixel element is magnified and projected to a display screen by an optical system. The type of modulation depends on how the modulator is combined with an optical system. Typically, each pixel is addressed and data pertaining to its desired state is loaded into a memory cell associated with that pixel. Then, the pixels change state to produce an image.

A thorough discussion of various types of SLM's is set out in the background section of U.S. Pat. No. 4,956,619. Devices sharing the same structural features as SLM's have been used for applications that do not involve light modulation. Examples of such applications are optical switching, light beam steering, and acceleration measurement. However, the term "SLM" is nevertheless used herein to describe these devices because of they also are characterized by addressable, micro-mechanical elements.

A frequently used type of SLM is the deformable mirror device (DMD), in which each pixel element is a tiny mirror, each capable of separate mechanical movement in response to an electrical input. Incident light may be modulated in direction, phase, or amplitude by reflection from each pixel element. Various DMD architectures have been developed, which include variations with respect to the type of mirror elements and the addressing circuit. Mirror element types include elastomer, membrane, and cantilever or torsion beam types. Addressing may be by e-beam input, optically, or by means of an electronic memory circuit. Cantilever and torsion beam architectures, in combination with integrated circuit addressing, are described in a article entitled "Deformable-Mirror Spatial Light Modulators", by Larry J. Hornbeck, published in *Proc. SPIE* 1150, pp. 86–102 (1990). As described therein, ideally, the memory cell circuit is designed so that it may be integrated with a mirror element superstructure, using conventional integrated circuit techniques. U.S. Pat. No. 4,956,619 describes a method of fabricating such DMD's. For example, in projection display applications, each SLM pixel element is associated with one or more memory cells.

In the past, the memory cell circuits for SLM's have been custom designed and usually resemble conventional dynamic random access memories (DRAM's). A description of the structure and operation of one form of memory cell design for DMD's is described in U.S. Pat. No. 5,079,544 entitled "Standard Independent Digitized Video System", filed Feb. 27, 1989, and assigned to the same assignee as the present invention.

A problem with dynamic memory designs is that relatively large storage capacitors are required at the cell site. When used in an SLM integrated circuit, these capacitors are susceptible to interlayer dielectric effects. Also, bi-stable SLM pixel designs require both signal polarities at the pixel site. To accomplish this bi-polarity with DRAM memory cells, either two drive lines and associated storage capacitors are required, or an inverter must be added to each cell. Finally, applications for SLM's involve illumination of the SLM, and as illumination increases, the refresh requirements of DRAM cells due to the charge carriers generated by illumination increases.

Although the use of static random access memory (SRAM) cells for the memory cell circuit would overcome some of the limitations of DRAM-based designs, there are problems associated with providing the power required for the SRAM cells. In SLM devices that require higher voltage levels for operating the array elements, if the same voltage is used to power the SRAM circuit, the result is a large current draw during writing to the cell as well as reduced writing speed. A need exists for an SRAM-based SLM design that does not have these limitations.

SUMMARY OF THE INVENTION

One aspect of the invention is an addressing circuit for use with a spatial light modulator (SLM) having an array of addressable, micro-mechanical elements. The addressing circuit's primary component is an array of static memory cells. At least one memory cell is in electronic communication with address electrodes of each SLM element. Each column of the memory cell array receives a data signal from a data bit-line common to all memory cells of that column. A two-level voltage is delivered to each memory cell, by means of a voltage supply line across rows of the memory cell array. A multiplexer varies the voltage on the voltage supply line, depending on whether the memory cells are being written with data or being used to bias the electrodes of the SLM elements. A row select switch in communication with each memory cell permits the data signal to be delivered to the memory cell if a row select signal has designated that row.

In the preferred embodiment, each static memory cell resembles the cell of conventional static random access memory architectures. For example, each of the memory cells may be a latch, and more specifically, may be comprised of a pair of cross-coupled inverters.

A technical advantage of the invention is that the SRAM-based design avoids the refresh requirements of DRAM based designs. The SRAM design is much less sensitive to illumination-generated charge carriers. The SRAM cells are also immune to degradation of addressing voltage by charge sharing of capacitors with the SLM elements or to body effect losses of transistors. The SRAM design permits non-destructive read-back—the cells can be read back any number of times without affecting the cell contents.

Existing SRAM circuit designs may be used, which eliminates the need to design and test new circuits and fabrication techniques. The invention is amenable to integrated circuit fabrication, and may be easily implemented as sublayers of the SLM.

The invention is especially useful in the case of cantilever or torsion-beam SLM designs, whose elements are micro-mechanical mirrors. The two-level power supply permits sufficient voltage for tilting the mirror elements while not hampering write operations. This voltage may be tailored to meet the needs of the particular mirror element architecture, an important feature in that the voltage requirements of different architectures cover a broad range of voltages, typically 5 to 10 volts. However, for writing to the cells, the voltage may be lowered to the minimum required for that purpose, which is typically lower than that required for tilting the mirrors. This prevents large current spikes during writing, and permits writing to be achieved at faster rates.

DETAILED DESCRIPTION OF THE INVENTION

Figure 1:
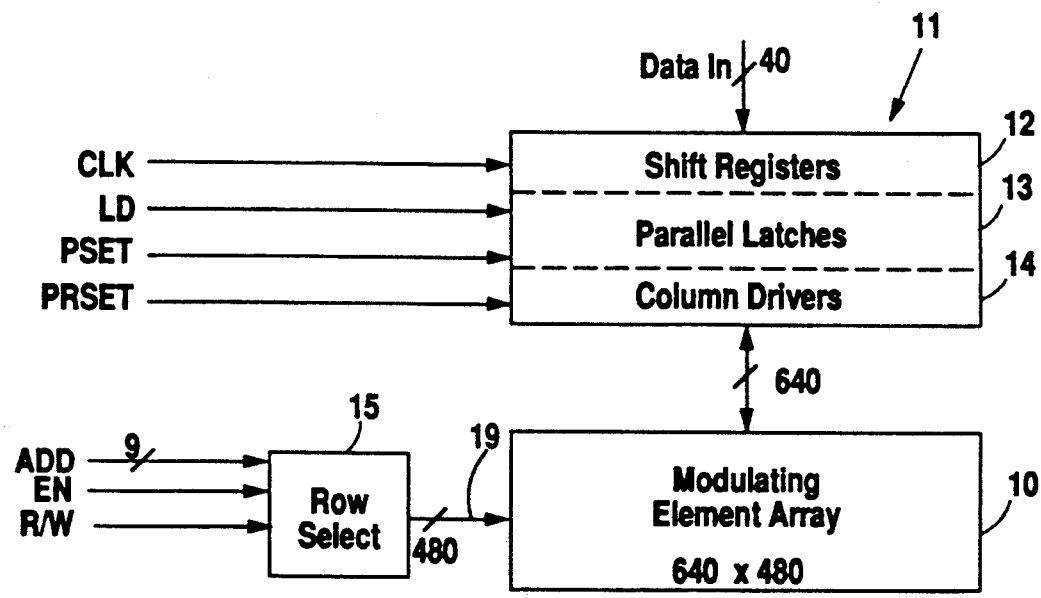
FIG. 1 illustrates the modulating element array of a spatial light modulator and its memory loading circuit.

FIG. 1 illustrates a spatial light modulator (SLM) array and its peripheral memory loading circuitry. As explained in the background of this patent application, SLM's have an array 10 of individually addressable, micro-mechanical, elements. For purposes of this description, SLM will be described in terms of a deformable mirror device (DMD), whose modulating elements are mirrors that deform by some sort of deflection or tilting movement. As explained below, each element is addressed with at least one pair of address electrodes, which bias the mirror and cause its movement. A memory cell associated with each pixel element stores data that determines its movement. However, the invention is useful for any type of SLM having micro-mechanical elements that are electrically addressable and have associated memory cells.

DMD array 10 operates by reflecting light from its mirror elements. Each mirror element represents a pixel of an image. An example of a DMD is the DMD device manufactured by Texas Instruments, Incorporated. As explained below, each mirror element of array 10 is in communication with at least one memory cell, which stores data regarding the on/off position of the mirror element.

In the example of this description, array 10 is a 640×480 element array. However, the concepts described herein could be implemented with any size array, with appropriate changes being made to the data widths described herein.

The array loading scheme illustrated in FIG. 1 is for line loading, where the memory cells associated with the modulating elements are loaded row by row. For this purpose, array 10 has an input unit 11, comprised of a shift register circuit 12, latch circuit 13, and column driver circuit 14. In the example of this description, array 10 receives data into 40 16-bit shift registers of shift register circuit 12. For a 640-column image, after 16 clock cycles, an entire display row is stored in shift register circuit 12. Shift register circuit 12 is controlled by a clock signal (CLK).

After shift register circuit 12 is loaded, it transfers its row of data to latch circuit 13. While data is latched and is subsequently being stored in a selected row of array 10, a next row of data may be loaded into shift register circuit 12. Latch circuit 13 is controlled by load, set, and reset signals (LD, PSET, and PRESET). Column driver circuit 14 drives 1 bit of row data to each column of array 10 along 640 bit-lines.

Additional logic may be added to input unit 11 for reading data out of the memory cells. For image display applications, the read back function is primarily used for electrical test.

Array 10 is also in communication with a row selector unit 15. As explained below in connection with FIG. 5, row selector 15 is comprised of decoders, one each associated with each row of array 10. Each decoder receives 9 bits of address data (ADD), which represent a row whose memory is to be loaded. Row selector 15 also receives a row enable signal (EN) and a read/write signal (R/W).

Figure 2A:
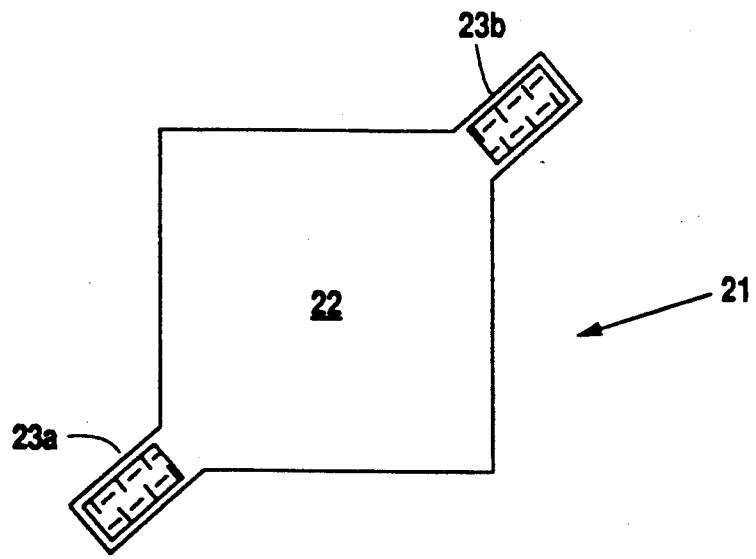
FIGS. 2A and 2B illustrate a moveable modulating element, such as might be used in the SLM array of FIG. 1.
Figure 2B:
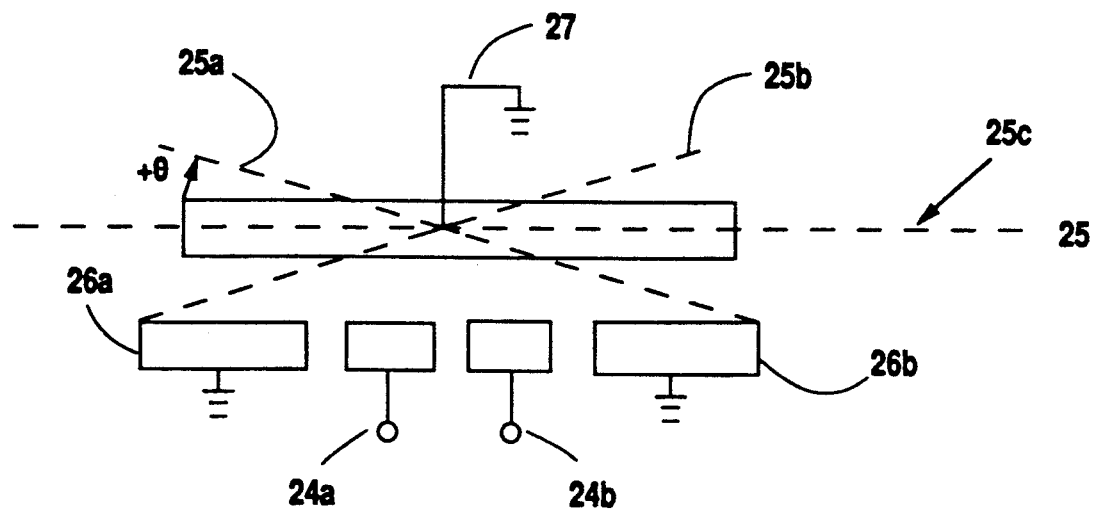

FIGS. 2A and 2B illustrate a movable pixel element 21, such as the modulating elements that comprise array 10. The pixel element 21 of FIGS. 2A and 2B is of a torsion-beam design, where a thick reflective beam, i.e., mirror 22, is suspended over an air gap and connected between two rigid supports by two thin torsion hinges 23a and 23b that are under tension. When an address electrode 24a or 24b, underlying one-half of mirror 22, is energized. An attractive force is applied to that portion of mirror 22, causing torsion hinges 23a and 23b to twist and mirror 22 to rotate about the axis of hinges 23a and 23b.

The movement of mirror 22 is shown in FIG. 2B. Mirror 22 moves about an axis from the position shown by the dotted line 25a to the position shown by the dotted line 25b relative to the plane surface 25c of mirror 22. In an "on" position, the edge of mirror 22 touches landing electrode 26a. Mirror 22 is moved to the "on" position by applying the proper voltages to address electrodes 24a and 24b. An added bias may be applied to mirror 22 through electrode 27. If an opposite voltage is applied to electrodes 24a and 24b, then mirror 22 will rotate to the position represented by the dotted line 25b and direct the light elsewhere.

The torsion-beam pixel of FIGS. 2A and 2B is only one type of modulating element structure, and many other structures are possible. These are distinguished by characteristics such as their deformation mode, pixel shape, and the hinge support means. However, for purposes of the invention herein, any sort of structure is satisfactory so long as each modulating element is capable of independent movement as a result of energizing its address electrodes.

Figure 3:
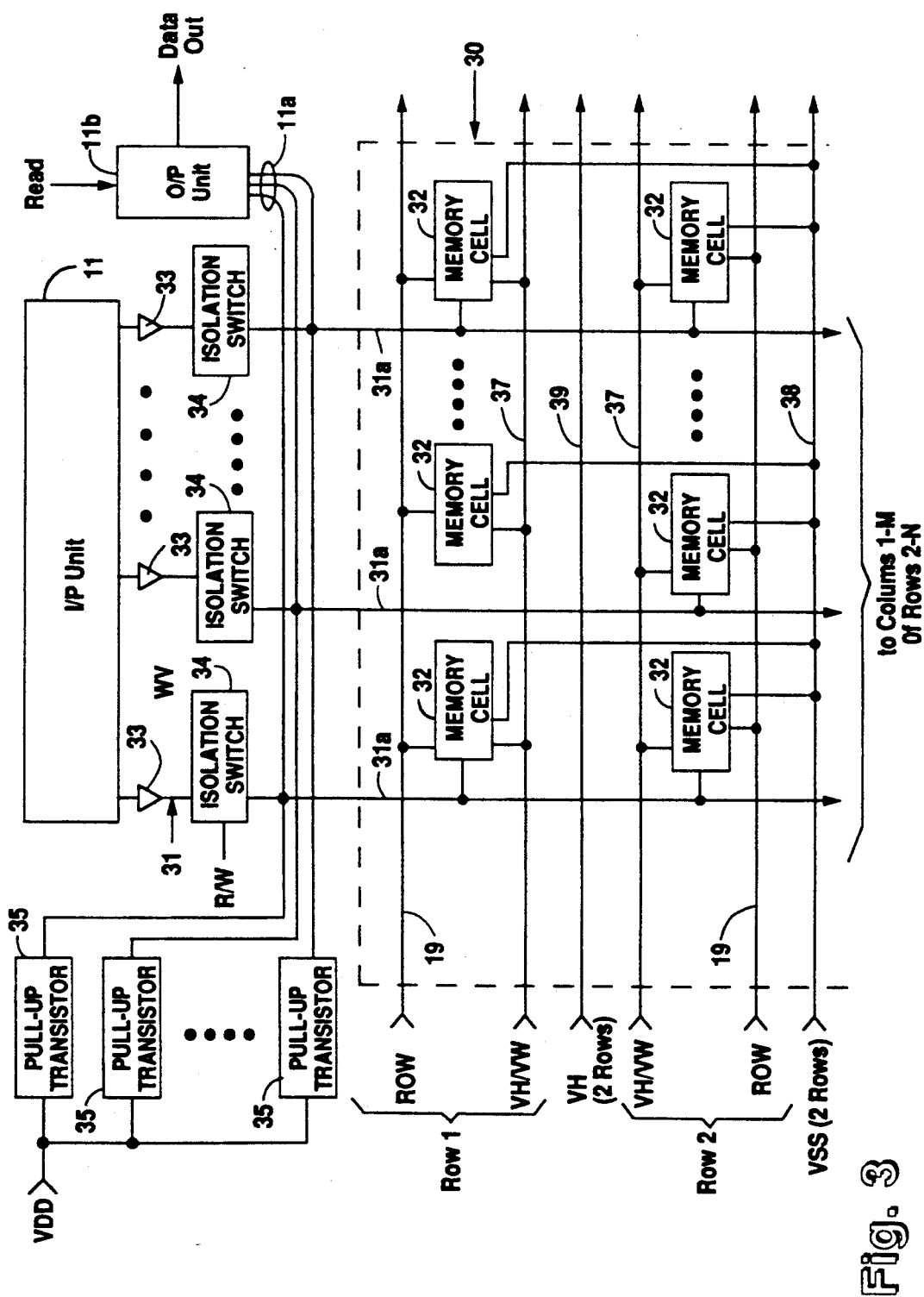
FIG. 3 illustrates the addressing circuit for the array of FIG. 1.

FIG. 3 illustrates the memory loading circuit of FIG. 1 in relation to the memory cell array 30 associated with the modulating element array 10. Only the top two rows of memory cell array 30 are shown; it should be understood that a complete array 30 would include a memory cell 32 for each modulating element 21. FIG. 3 is a simplified embodiment in that each modulating element 21 has only one memory cell 32; other embodiments might have more than one memory cell 32 per modulating element 21.

For write operations, memory cell array 30 receives data input (DATA) from input unit 11, via an input line 3 for each column. As described above, for each DATA input along input line 31; latch circuit 13 holds the data during the time for driving it to the memory cells 32 of that column.

After being latched, each input line 31 runs to write buffer 33, and then to isolation switch 34. Another input to isolation switch 34 is a R/W signal. Isolation switch 34 is explained below in connection with FIG. 4.

Pull-up transistor 35 is always "on" and pulls the voltage on bit-line 31a toward a desired voltage, VDD. In the example of this description, VDD is 5 volts.

The DATA signal on each bit-line 31a is input to a column of memory cell array 30. A row select signal, ROW, along one of the row select lines 19 from row select unit 15, determines the row to which DATA will be written. By way of analogy to conventional SRAM applications, the ROW line into each cell 32 is analogous to a memory word line.

Each memory cell 32 receives input from a two-level voltage supply line, VH/VW line 37. A first level, VW, is used while the memory cells 32 of a row are being written. After these cells 32 have reached their new state, another level, VH, typically a higher voltage of 5-8 volts, is used to vary the voltage at the address electrodes 24a and 24b of the modulating- elements 21, to tilt them in a desired direction. A multiplexer circuit for switching between these voltages is explained below in connection with FIG. 5. The VSS line 38 is to a common level, and in this example, is to circuit ground.

An advantage of the invention, especially when used with cantilever-beam or torsion-beam SLM's, is that the second voltage level, VH, which is used for operating the modulating elements 21, may be tailored to match their mechanical compliance. The threshold voltage for deflecting the mirror element 21 can be determined, and VH matched to that level. This reduces the need for additional biasing for the modulating elements 21 from a separate source. Finally, for modulating elements 21 that tilt in two directions, both voltage polarities of the mirror deflection voltage may be easily made available.

Where memory cell array 30 is an integrated circuit, the VH voltage supply is delivered along an additional VH line 39 across each row of array 30. The purpose of VH line 39 is to provide a VH supply to N-wells in the silicon, which permits the VH voltage level to reach each memory cell 32 in the row without substantial loss of voltage.

As shown in FIG. 3, in the preferred embodiment, each VSS line 38 and VH line 39 across array 30 is shared by two rows of memory cells 32. This economizes on space and materials.

As stated above, this description is in terms of write operations, although read out may also be performed by adding appropriate logic circuitry. For example, output lines 11a could be connected to bit-line 31a below isolation switch 34. An output unit 11b having control and timing logic would control when data on these lines 11a are available for read back.

Figure 4:
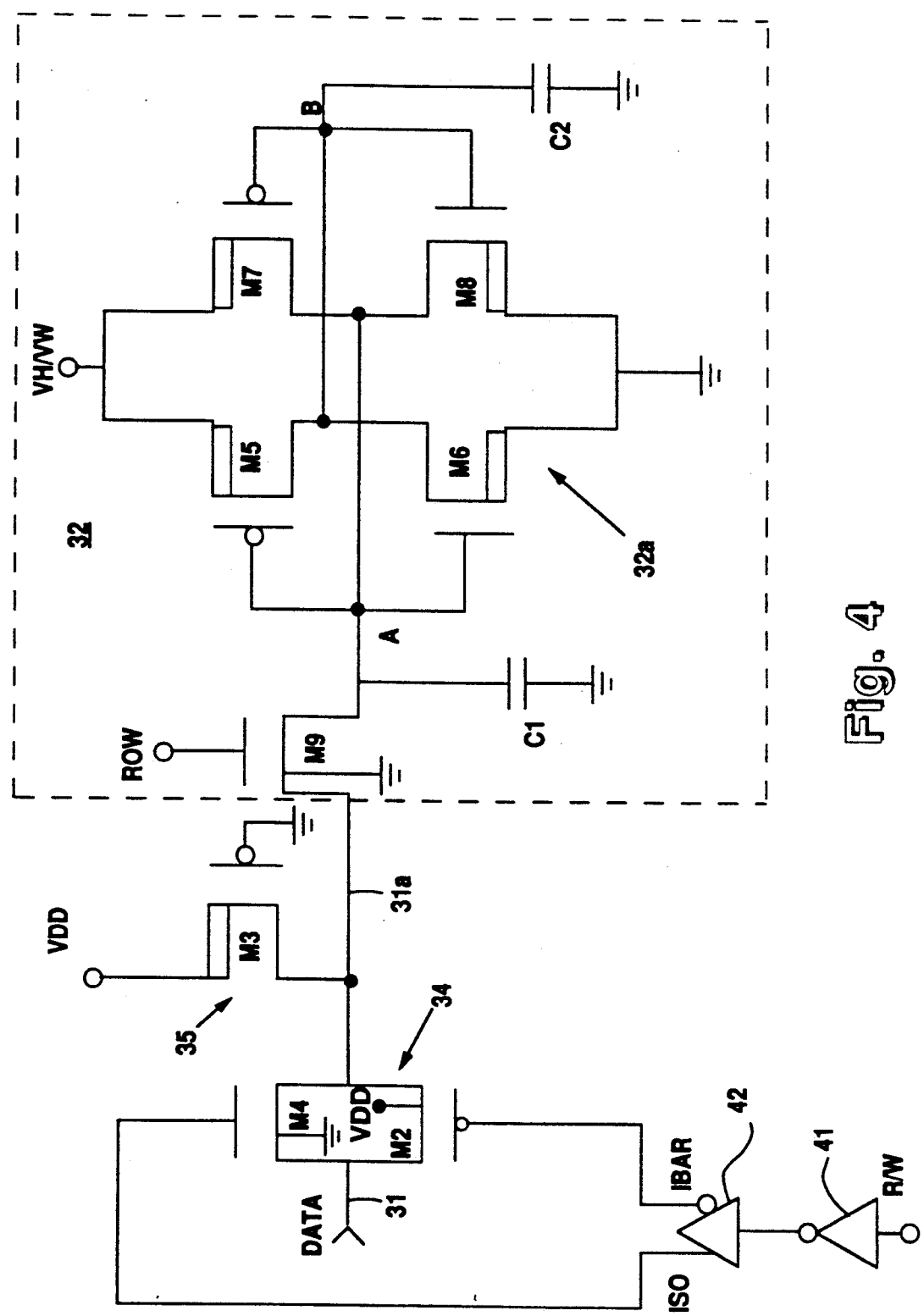
FIG. 4 illustrates an isolation switch and pull-up transistor, such as are associated with each column, and a single memory cell for that column.

FIG. 4 illustrates an isolation switch 34, pull-up transistor 35, such as are associated with each column of array 30, as well as a single memory cell 32 for that column. Various transistors in both circuits are referred to as "M*" where * designates a transistor number. In this embodiment, each transistor is an insulated gate field effect transistor. Transistors M2, M3, M5, and M7 are p-channel transistors; transistors, M4, M6, M8, and M9 are n-channel transistors. The capacitances, C1 and C2, represent the capacitive loads presented to memory cell 32 by the modulating element 21.

Isolation switch 34 is comprised of two transistors, M2 and M4, which cut off input unit 11 from memory array 30. The signals, phase isolate (ISO) and its complement (IBAR) activate switch 34, and are applied synchronized in time and of opposite polarity. The transistors M2 and M4 maximize the voltage swing that can be passed by switch 34.

Pull-up transistor 35 is comprised of a transistor, M3, having its drain connected to the DATA bit-line 31a from isolation switch 34 and its source connected to VDD. As stated above, transistor 35 is always "on" such that the column has a resistive connection to VDD.

Memory cell 32 is comprised of an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal.

In the preferred embodiment, latch 32a is formed from two cross-coupled inverters, M5/M6 and M7/M8, which permit two stable states. Where nodes A and B represent electrodes 24a and 24b of a modulating element 21, state 1 is Node A high and Node B low and state 2 is Node A low and Node B high. These states are stable in the absence of a disturbing voltage at Node A. This disturbing voltage is present at node A when it is desired to change the contents of the latch 32a. The two stable states are desirable for delivering both signal polarities to modulating elements 21.

The switching of VH/VW between voltage levels is explained above. The SLM circuitry, including the circuitry of memory array 30, uses three voltages. In general, $$VW < = VDD < = VH$$

Figure 5:
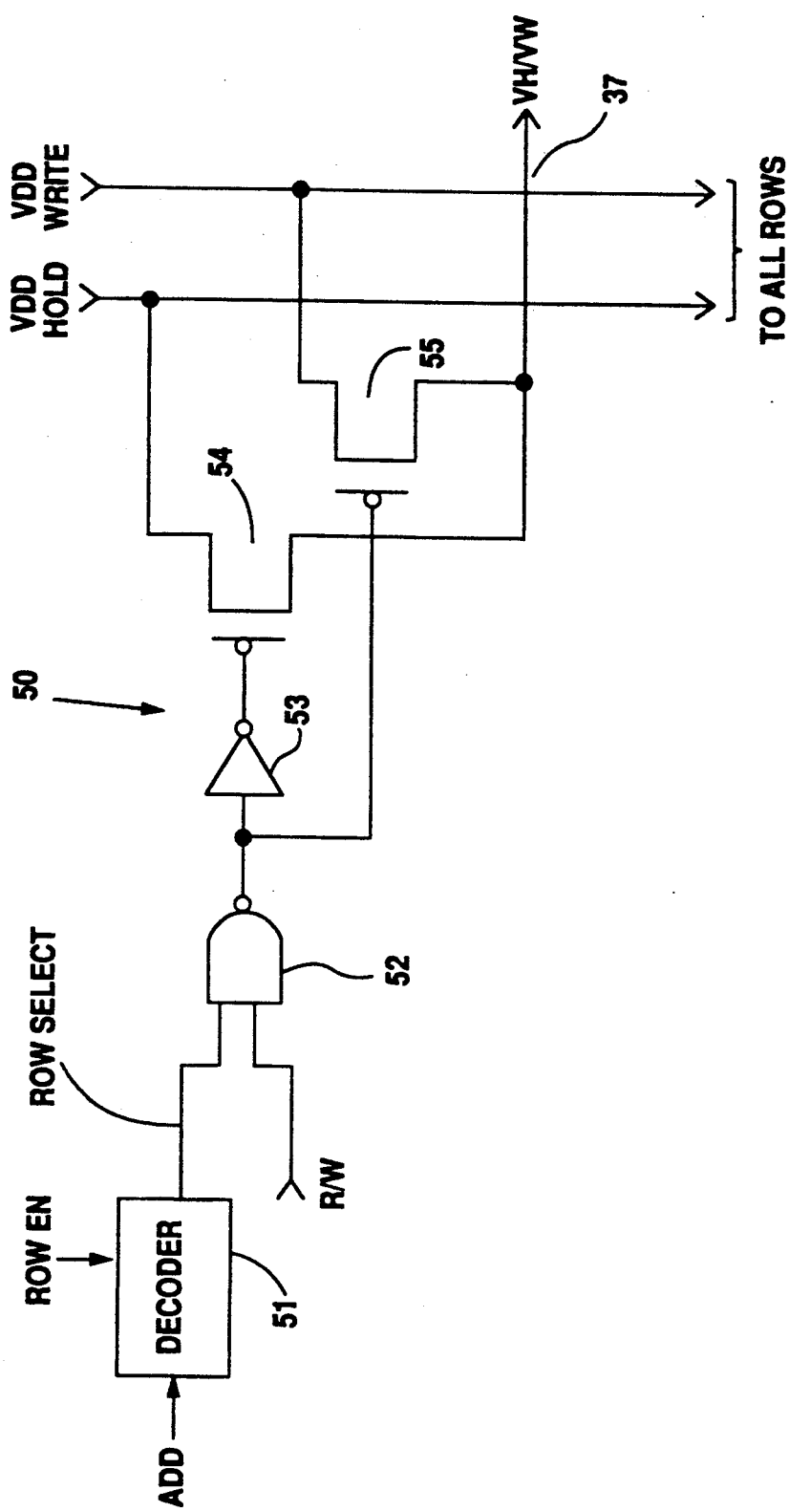
FIG. 5 illustrates a multiplexer circuit for shifting the voltage into each memory cell.

FIG. 5 illustrates a multiplexer 50 for switching the voltage on a VH/VW line 37 between the voltage level used for writing to memory (VW) ad the value used for operating the modulating elements 21 (VH). Each row of array 10 has a multiplexer circuit 50.

As explained above, each row of array 10 has a decoder unit 51, which decodes address data and if enabled by a row enable signal, ROW EN, provides a ROW SELECT signal to its row. The ROW SELECT signal is also delivered to NAND gate 52, as well as a R/W signal. The R/W signal is a global signal, and if true, its input, combined with a true input on ROW SELECT causes NAND gate 52 to output a low signal. A low output from NAND gate 52 turns on pass transistor 55 and causes the lower VDD WRITE voltage level to be connected to VH/VW line 37. A high output from NAND gate 52 causes the higher VDD HOLD voltage level to be connected to VH/VW line 37 via inverter 53 and pass transistor 54. In this manner, each row receives the lower VW voltage only while it is being written, and during this time, all other rows receive the higher VH voltage.

NAND gate 52 and inverter 53 are in electrical connection with the higher voltage source, VDD HOLD. Pass transistors 54 and 55 are p-channel transistors that operate in a complementary manner.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A memory circuit for use with a spatial light modulator array of electrically addressable, micro-mechanical, elements, comprising:
   an array of static memory cells, wherein each element of the spatial light modulator is in communication with at least one memory cell via address electrodes;
   a two-level voltage supply input line in communication with each of said memory cells, for providing at least a first voltage level for writing to said cells and at least a second voltage level for operating said elements of said spatial light modulator;
   a multiplexer for switching either said first voltage level or said second voltage level onto said two-level voltage supply input line on a row by row basis;
   an access switch in communication with each of said memory cells for delivering data to said memory cell in accordance with the state of row select signal;
   a data bit-line in communication with each of said access switches, wherein said data bit-line is common to all memory cells of a column of said memory cell array; and
   a row select signal line in communication with each of said access switches.

2. The memory circuit of claim 1, wherein each of said memory cells is a latch.

3. The memory circuit of claim 1, wherein each of said memory cells is a pair of cross-coupled inverters.

4. The memory circuit of claim 1, wherein said memory circuit is fabricated by complementary metal oxide semiconductor (CMOS) fabrication means.

5. The memory circuit of claim 1, and further comprising an isolation switch associated with each column of modulating elements for isolating said memory cells from other circuitry of said spatial light modulator.

6. The memory circuit of claim 5, wherein said isolation switch is in communication with an inverter that generates signals of opposite polarity for input to said isolation switch.

7. The memory circuit of claim 1, and further comprising a pull-up transistor in communication with the data input node of said access switch for pulling the voltage on said bit-line toward a desired value.

8. The memory circuit of claim 1, and further comprising a plurality of said multiplexers, one for each row of said memory cell array.

9. The memory circuit of claim 1, wherein said first and second voltage levels are delivered via a line to each row of said memory cell array.

10. A spatial light modulator system, comprising:
    an array of spatial light modulating elements, wherein each modulating element is electrically addressable to determine the manner in which it will modulate incident light;
    an array of static memory cells, wherein each of said modulating elements is in communication, via address electrodes, with at least one memory cell;
    an access switch in communication with a memory cell of each modulating element for delivering data to said memory cell in accordance with the state of a row select signal;
    at least two voltage signals;
    a multilevel voltage supply line for providing said at least two voltage signals to each of said memory cells;
    a plurality of multiplexers for selecting which of said at least two voltage signals to provide to said memory cells on a row by row basis, one multiplexer for each row of said array; and
    an input loading circuit for leading data into said memory cell array.

11. The system of claim 10, wherein said input loading circuit has a shift register, parallel latches, and column drivers.

12. The system of claim 10, and further comprising a means for reading data out from said memory cell array.

13. The system of claim 10, wherein said two-level voltage supply is delivered via a line to each row of said memory cell array.

14. The system of claim 10, wherein said memory cells are comprised of cross-coupled inverters.

15. A method of addressing an array of memory cells used to operate a spatial light modulator having an array of modulating elements, where at least one memory cell is associated with each modulating element, comprising the steps of:
    delivering a data signal, which represents a state of said modulating element, to said memory cell;
    supplying a first voltage level to said memory cell;
    writing said data signal to said memory cell while said memory cell is powered by said first voltage level;
    supplying a second voltage level to said memory cell; and
    energizing said modulating element while said memory cell is powered by said second voltage level.

16. The method of claim 15, and further comprising the step of delivering a row select signal to a row of said memory cells to determine whether said memory cell will receive said data signal.

17. The method of claim 15, and further comprising the step of electronically isolating said memory cell array from other electronic circuitry of said spatial light modulator.

18. The method of claim 15, and further comprising the step of controlling the steps of supplying said first voltage level and supplying said second voltage level by means of a row select signal.

19. The method of claim 15, and further comprising the step of generating two polarities of said second voltage level as output of said memory cell.

* * * * *